(12) United States Patent
Wu et al.

(10) Patent No.: US 9,680,397 B2
(45) Date of Patent: Jun. 13, 2017

(54) THREE-PHASE INVERTING APPARATUS AND CONTROL METHOD AND PARALLELED POWER CONVERSION SYSTEM THEREOF

(71) Applicant: National Tsing Hua University, Hsinchu (TW)

(72) Inventors: Tsai-Fu Wu, Hsinchu (TW); Chih-Hao Chang, Hsinchu (TW); Ying-Yi Jhang, Hsinchu (TW); Li-Chiun Lin, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/975,861

(22) Filed: Dec. 21, 2015

(65) Prior Publication Data
US 2017/0104423 A1    Apr. 13, 2017

(30) Foreign Application Priority Data
Oct. 13, 2015    (TW) .............................. 104133438 A

(51) Int. Cl.
*H02M 7/537*    (2006.01)

(52) U.S. Cl.
CPC .................................. *H02M 7/537* (2013.01)

(58) Field of Classification Search
CPC ...... H02M 7/537; H02M 7/538; H02M 1/045; H02M 1/084
See application file for complete search history.

(56) References Cited

U.S. PATENT DOCUMENTS

| 4,096,558 A | 6/1978 | Jensen |
| 6,466,465 B1 * | 10/2002 | Marwali ................. H02M 1/32 361/79 |

(Continued)

FOREIGN PATENT DOCUMENTS

| CN | 1588780 | 3/2005 |
| CN | 101863413 | 10/2010 |

(Continued)

OTHER PUBLICATIONS

Wu et al., "Improvement of Control-Law Derivation and Region Selection for D-Σ Digital Control," IEEE Transactions on Industrial Electronics, Apr. 2015, pp. 6042-6050.

(Continued)

*Primary Examiner* — Emily P Pham
(74) *Attorney, Agent, or Firm* — Jianq Chyun IP Office

(57) ABSTRACT

A three-phase inverting apparatus and a control method and a paralleled power conversion system thereof are provided. The control method is suitable for controlling a three-phase inverter having a plurality of switch sets, a first inductor, a second inductor, and a third inductor. The control method includes following steps: obtaining a DC bus voltage, a plurality of phase voltages, and a plurality of phase currents; obtaining inductances of the first, the second, and the third inductors; calculating a plurality of switch duty ratios by a division-summation control means according to the DC bus voltage, the phase voltages, current variations of the phase currents, the inductances, and a switching cycle based on a sinusoidal pulse width modulation (SPWM); and generating corresponding control signals based on the switch duty ratios so as to control a switching of the switch sets.

13 Claims, 4 Drawing Sheets

(56) References Cited

U.S. PATENT DOCUMENTS

| | | | | |
|---|---|---|---|---|
| 6,545,887 | B2* | 4/2003 | Smedley | H02J 3/01 |
| | | | | 363/44 |
| 8,374,011 | B2* | 2/2013 | Wirth | H02M 7/49 |
| | | | | 363/125 |
| 8,780,594 | B2 | 7/2014 | Chi et al. | |
| 9,413,260 | B1* | 8/2016 | Wu | H02M 7/483 |
| 2012/0224403 | A1* | 9/2012 | Wu | H02M 7/53873 |
| | | | | 363/132 |

FOREIGN PATENT DOCUMENTS

| | | |
|---|---|---|
| CN | 103280999 | 9/2013 |
| CN | 203537255 | 4/2014 |
| TW | 201236356 | 9/2012 |
| TW | 201238229 | 9/2012 |
| TW | 201312926 | 3/2013 |

OTHER PUBLICATIONS

Wu et al., "SPWM-Based D-Σ Digital Control for Paralleled 3-f Grid-Connected Inverters," 2015 IEEE Energy Conversion Congress and Exposition (ECCE), Sep. 20-24, 2015, pp. 6818-6824.
"Office Action of Taiwan Counterpart Application", issued on Aug. 22, 2016, p. 1-p. 7.

* cited by examiner

THREE-PHASE INVERTING APPARATUS AND CONTROL METHOD AND PARALLELED POWER CONVERSION SYSTEM THEREOF

CROSS-REFERENCE TO RELATED APPLICATION

This application claims the priority benefit of Taiwan application serial no. 104133438, filed on Oct. 13, 2015. The entirety of the above-mentioned patent application is hereby incorporated by reference herein and made a part of this specification.

BACKGROUND OF THE INVENTION

Field of the Invention

The invention relates to a power conversion control technique, and more particularly, to a three-phase inverting apparatus and a control method and a paralleled power conversion system thereof.

Description of Related Art

Among green energy, solar energy is an inexhaustible energy. Techniques related to the solar energy are growingly developed. After the solar energy is obtained by a solar power-generation apparatus (e.g., a solar panel) and then converted into electricity, the electricity can be directly incorporated into a local distribution network or stored in batteries. However, the batteries relatively cost high due to limited lifespan thereof. In case an inverter is used, if the solar energy is directly incorporated into the local distribution network through the inverter, power consumption during transmission can be reduced, as well as power loss can be lowered down, which leads to higher efficiency of the power-generation system.

For the existing power conversion systems, reliability of the inverter is a very important factor in design considerations for realizing stable power supply and conversion. However, as restricted by unexpected influences such as working environment factors and control interferences, none of the inverter designs can absolutely guarantee that no failure will occur during operations. Further, in response to the trend towards the increasing load capacity, a power converter must also increase its own capacity in order to satisfy requirements in various applications.

To reduce risks of the power supply being stopped due to failure of the inverter, a power conversion system architecture formed by multiple inverters connected in parallel has been proposed in the existing applications, so that the other inverters can still operate when failure occurs on one of the inverters. However, in the existing paralleled power conversion systems, the issue of circulating current will generally occur due to inconsistent output currents from each of the inverters, resulting in an unstable system operation.

In addition, because an inductance of a three-phase inverter does not remain unchanged, the inductance will become smaller if the current is greater in the system with greater power. If a controller fails to take into account the inductance variation, it is bound to overcome the insufficient inductance by using extremely large amount of compensations, which lead to risks of oscillations or even divergence in the system.

SUMMARY OF THE INVENTION

The invention is directed to a three-phase inverting apparatus and a control method and a paralleled power conversion system thereof, which are capable of solving the problems mentioned in Description of Related Art.

A control method of three-phase inverter of the invention is suitable for controlling a three-phase inverter having a plurality of switch sets, a first inductor, a second inductor and a third inductor. The control method includes following steps: obtaining a DC bus voltage, a first phase voltage, a second phase voltage and a third phase voltage, and a first phase current, a second phase current and a third phase current respectively flowing through the first inductor, the second inductor and the third inductor; obtaining inductances of the first inductor, the second inductor and the third inductor, wherein the inductances respectively vary with the first phase current, the second phase current and the third phase current; calculating a plurality of switch duty ratios by a division-summation control means according to the DC bus voltage, the phase voltages, current variations of the phase currents, the inductances, and a switching cycle based on a sinusoidal pulse width modulation (SPWM); and generating corresponding control signals based on the switch duty ratios so as to control a switching of the switch sets.

In an embodiment of the invention, the step of obtaining the inductances of the first inductor, the second inductor, and the third inductor includes: reading a lookup table indicating a correspondence relationship between different current levels and the inductances; and selecting values matching the first phase current, the second phase current and the third phase current from the lookup table to serve as the inductances of the first inductor, the second inductor and the third inductor.

In an embodiment of the invention, the three-phase inverter has a DC terminal and a three-phase power terminal, and the control method further includes following steps: when the three-phase inverter operates in a first operation mode, providing the control signals based on the calculated switch duty ratios so that an electrical energy of the DC terminal is converted in response to the switching of the switch sets and provided to the three-phase power terminal; and when the three-phase inverter operates in a second operation mode, providing the control signals based on the calculated switch duty ratios so that an electrical energy of the three-phase power terminal is converted in response to the switching of the switch sets and provided to the DC terminal.

In an embodiment of the invention, the step of calculating the switch duty ratios by the division-summation control means includes: establishing an equivalent loop equation associated with a mean state voltage of each of the switch sets; obtaining a plurality of division-summation control equations based on the sinusoidal pulse width modulation of the switch sets according to the equivalent loop equation; and respectively substituting the DC bus voltage, the phase voltages, the current variations and the switching cycle in the division-summation control equations so as to calculate the switch duty ratios.

In an embodiment of the invention, the equivalent loop equation is expressed by $$\bar{u}_X = L_X \frac{di_{LX}}{dt} + v_{XN} + \bar{v}_{NO},$$

wherein $\bar{u}_X$ being the mean state voltage, $L_X$ being the inductance of each of the inductors, $i_{LX}$ being each of the phase currents, $v_{XN}$ being each of the phase voltages, and $\bar{v}_{NO}$ being a neutral point voltage.

In an embodiment of the invention, the division-summation control equations are expressed by $$d_R = \frac{L_R \Delta i_{LR}}{T_S v_{DC}} + \frac{v_{RN}}{v_{DC}} + \frac{1}{2}; d_S = \frac{L_S \Delta i_{LS}}{T_S v_{DC}} + \frac{v_{SN}}{v_{DC}} + \frac{1}{2}; \text{ and}$$

$$d_T = \frac{L_T \Delta i_{LT}}{T_S v_{DC}} + \frac{v_{TN}}{v_{DC}} + \frac{1}{2},$$

wherein $d_R$, $d_S$ and $d_T$ respectively being a first switch duty ratio, a second switch duty ratio and a third switch duty ratio, $L_R$, $L_S$ and $L_T$ respectively being the first inductor, the second inductor and the third inductor, $\Delta i_{LR}$, $\Delta i_{LS}$ and $\Delta i_{LT}$ respectively being the current variations of the first phase current, the second phase current and third phase current within the switching cycle, $T_S$ being the switching cycle, $v_{DC}$ being the DC voltage, and $v_{RN}$, $v_{SN}$ and $v_{TN}$ respectively being the first phase voltage, the second phase voltage and the third phase voltage.

In an embodiment of the invention, the step of obtaining the division-summation control equations based on the sinusoidal pulse width modulation of the switch sets according to the equivalent loop equation include: establishing a current source model of the three-phase inverter according to the equivalent loop equation and calculating a working point of each of the switch sets; calculating a controller gain according to the current source model; and establishing the division-summation control equations based on the controller gain and the working point of each of the switch sets.

A three-phase inverting apparatus of the invention includes a three-phase inverter, a driving circuit and a controller. The three-phase inverter has a plurality of switch sets, a first inductor, a second inductor and a third inductor. A first phase current, a second phase current and a third phase current respectively flow through the first inductor, the second inductor and the third inductor. The driving circuit is coupled to the three-phase inverter and provides a plurality of control signals to control the three-phase inverter. The controller is coupled to the driving circuit to control operations of the driving circuit. The controller obtains a DC bus voltage, a first phase voltage, a second phase voltage and a third phase voltage, the first phase current, the second phase current and the third phase current, and inductances of the first inductor, the second inductor and the third inductor, and then calculates a plurality of switch duty ratios by a division-summation control means according to the DC bus voltage, the phase voltages, current variations of the phase currents, the inductances, and a switching cycle based on a sinusoidal pulse width modulation. The controller controls the driving circuit based on the switch duty ratios to generate the corresponding control signals so as to control a switching of the switch sets. The inductances respectively vary with the first phase current, the second phase current and the third phase current.

In an embodiment of the invention, the controller includes a storage unit. The storage unit stores a lookup table indicating a correspondence relationship between different current levels and the inductances. The controller reads the lookup table of the storage unit when the controller calculates the switch duty ratios by the division-summation control means, so as to select values matching the first phase current, the second phase current and the third phase current from the lookup table to serve as the inductances of the first inductor, the second inductor and the third inductor.

In an embodiment of the invention, the three-phase inverting apparatus further includes a first feedback circuit and a second feedback circuit. The first feedback circuit is coupled to the controller and a three-phase power terminal of the three-phase inverter, and configured to sample the phase voltages and the current variations of the phase currents from the three-phase power terminal and provide the sampled phase voltages and the sampled current variations to the controller. The second feedback circuit is coupled to the controller and a DC terminal of the three-phase inverter, and configured to sample the DC bus voltage from the DC terminal and provide the sampled DC bus voltage to the controller.

In an embodiment of the invention, the controller establishes a plurality of division-summation control equations based on the sinusoidal pulse width modulation, and respectively substitutes the DC bus voltage, the phase voltages, the current variations and the switching cycle in the division-summation control equations so as to calculate the switch duty ratios.

A paralleled power conversion system of the invention includes a plurality of the three-phase inverting apparatuses described above. The DC terminals of the three-phase inverters are to each other in parallel, and the three-phase power terminals of the three-phase inverters are connected to each other in parallel.

In an embodiment of the invention, one of the three-phase inverting apparatuses is a master inverting apparatus, and the rest of three-phase inverting apparatuses are slave inverting apparatuses. The master inverting apparatus performs a voltage regulation control so as to generate the corresponding control signal to control the three-phase inverter of the master inverting apparatus in order to maintain a voltage level of the DC bus voltage. The slave inverting apparatuses perform an equal current distribution control according to a DC bus current on the DC terminal and an amount of the three-phase inverting apparatuses so as to calculate a current magnitude to be compensated to each of the slave inverting apparatuses and thereby generate the corresponding control signals for controlling each of the three-phase inverters of the slave inverting apparatuses.

In an embodiment of the invention, each of the three-phase inverting apparatuses independently tracks a current command of itself so as to compress a circulating current between each of the three-phase inverting apparatuses.

Based on the above, the invention proposes a three-phase inverting apparatus and a control method and a paralleled power conversion system thereof. Said control method adopts the division-summation control means based on the sinusoidal pulse width modulation to calculate the switch duty ratio of each of the switch sets in the three-phase inverter according to operation information of the three-phase inverter. Accordingly, the three-phase inverter applying the control method of the present application can conduct the corresponding control adjustment in response to the inductance variations, so as to avoid the distortion caused by output harmonic of the local distribution network. Further, because the control method of the present application does not requires complex calculation of abc to dq axial transformation as used in the conventional control means, the conversion procedure may be simplified. Furthermore, because the present application regards each phase loop as the independent loop for analysis based on the SPWM modulation to thereby derive the D-Σ control law, when the paralleled power conversion system is constituted by applying the three-phase inverting apparatuses of the present application, each of the three-phase inverting apparatuses can tracks the current command of itself so that the issue of circulating current may be effectively suppressed for the paralleled power conversion system.

To make the above features and advantages of the present disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
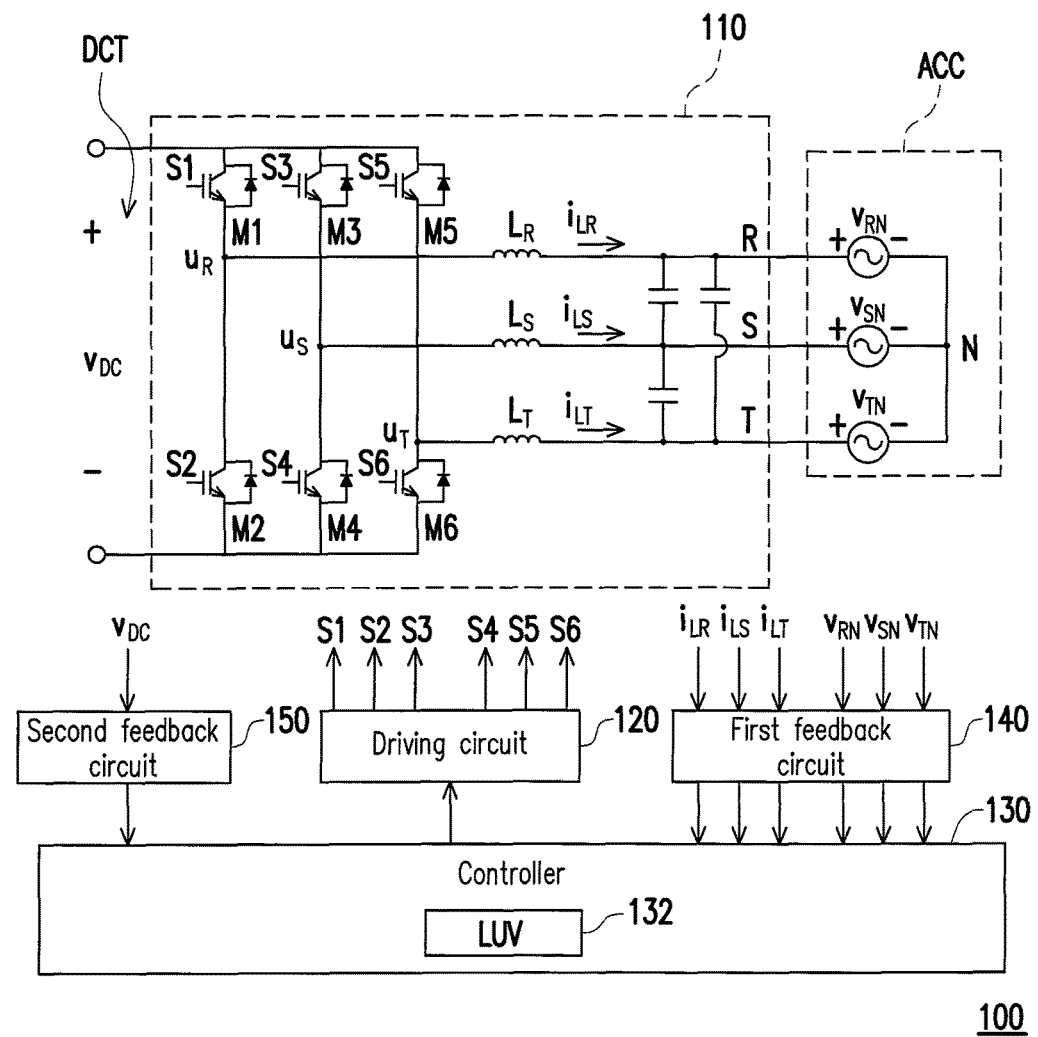
FIG. 1 is a schematic diagram illustrating an architecture of a three-phase inverting apparatus according to an embodiment of the invention.

In order to make content of the invention more comprehensible, embodiments are described below as the examples to prove that the invention can actually be realized. Moreover, elements/components/steps with same reference numerals represent same or similar parts in the drawings and embodiments.

FIG. 1 is a schematic diagram illustrating an architecture of a three-phase inverting apparatus according to an embodiment of the invention. Referring to FIG. 1, a three-phase inverting apparatus 100 includes a three-phase inverter 110, a driving circuit 120, a controller 130, a first feedback circuit 140 and a second feedback circuit 150.

In the present embodiment, the three-phase inverter 110 is described by using, for example, a full-bridge type inverter architecture including switch sets M1 to M6 and inductors $L_R$, $L_S$ and $L_T$ (inductances of the inductors described below are also represented by the reference numbers $L_R$, $L_S$ and $L_T$), but the invention is not limited thereto. In other embodiments, the three-phase inverter 110 may also be a half-bridge inverter architecture, or other types of inverter architectures. The three-phase inverter 110 has a DC terminal DCT and a three-phase power terminal (R, S and T). Herein, the switch sets M1 and M2 are connected to each other in series to constitute a bridge arm BA1; the switch sets M3 and M4 are connected to each other in series to constitute a bridge arm BA2; and the switch sets M5 and M6 are connected to each other in series to constitute a bridge arm BA3. Input terminals of the bridge arms BA1 to BA3 are coupled to serve as a DC load at the front end coupled to the DC terminal DCT (e.g., a solar cell) for receiving/outputting a DC bus voltage $v_{DC}$. Output terminals of the bridge arms BA1 to BA3 are coupled to one terminal of each of the inductors $L_R$, $L_S$ and $L_T$, whereas another terminal of each of the inductors $L_R$, $L_S$ and $L_T$ serves as the three-phase power terminal (R, S and T)

to be coupled to a three-phase power in an AC circuit ACC (e.g., power outputted from the local distribution network or other AC powers). Herein, a cross voltage the power terminal R and a neutral point N is a phase voltage $v_{RN}$; a cross voltage the power terminal S and the neutral point N is a phase voltage $v_{SN}$; and a cross voltage the power terminal T and the neutral point N is a phase voltage $v_{TN}$.

During operations of the three-phase inverter 110, on states of the switch sets M1 to M6 are switched under control of corresponding control signals S1 to S6 respectively. The switch sets M1, M3 and M5 respectively serve as upper arms of the bridge arms BA1 to BA3, and the switch sets M2, M4 and M6 respectively serve as lower arms of the bridge arms BA1 to BA3. Herein, the upper arm switch (e.g., M1, M3, M5) and the lower arm switch (e.g., M2, M4, M6) in the same bridge arm (BA1 to BA3) receive the complementary control signals so the switch sets in the same bridge arm (BA1 to BA3) are alternately turned on (e.g., the switch sets S1 and S2 are alternately turned on; the switch sets S3 and S4 alternately turned on; and the switch sets S5 and S6 alternately turned on), such that state voltages $u_R$, $u_S$ an $u_T$ are respectively generated on the output terminals of the bridge arms BA1 to BA3 according to the DC bus voltage $v_{DC}$. The inductors $L_R$, $L_S$ and $L_T$ charge or discharge respectively in response to variations of the state voltages $u_R$, $u_S$ and $u_T$, so as to generate phase currents $i_{LR}$, $i_{LS}$ and $i_{LT}$ on the inductors $L_R$, $L_S$ and $L_T$ respectively. Accordingly, the three-phase inverter 110 may then convert power between the DC terminal DCT and the three-phase power terminal (R, S and T).

The controller 130 is coupled to the driving circuit 120 and configured to calculate/obtain switch duty ratios based on a sinusoidal pulse width modulation (SPWM) of the switch sets M1 to M6 of the three-phase inverter 110 so as to control the driving circuit 320 to generate the corresponding control signals S1 to S6 for driving each of the switch sets M1 to M6 of the three-phase inverter 310.

The first feedback circuit 140 is coupled to the controller 130 and the three-phase power terminal (R, S and T) of the three-phase inverter 110. The first feedback circuit 140 may be used to sample the phase voltages $v_{RN}$, $v_{SN}$ and $v_{TN}$ and current variations (which are represented by $\Delta i_{LR}$, $\Delta i_{LS}$ and $\Delta i_{LT}$ below) of the phase currents $i_{LR}$, $i_{LS}$ and $i_{LT}$ from the three-phase power terminal R, S, T, and provide the sampled phase voltages $v_{RN}$, $v_{SN}$ and $v_{TN}$ and the current variations of the phase currents $i_{LR}$, $i_{LS}$ and $i_{LT}$ to the controller 130. The second feedback circuit 150 is coupled to the controller 130 and the DC terminal DCT of the three-phase inverter 110. The second feedback circuit 150 may be used to sample the DC bus voltage $v_{DC}$ from the DC terminal DCT, and provides the sampled DC bus voltage $v_{DC}$ to the controller 130.

In response to application requirements, the three-phase inverter 110 of the present embodiment may be operated in two different modes such as a grid-connection mode or a rectification with power factor correction mode.

When the three-phase inverter 110 operates in the grid-connection mode, the driving circuit 120 provides the control signals S1 to S6 based on the switch duty ratios calculated by the controller 130 so that an electrical energy of the DC terminal DCT is converted in response to a switching of the switch sets M1 to M6 and provided to the three-phase power terminal (R, S and T). For instance, a solar energy power conversion system is taken as an example below. In the gird-connection mode, when an electric power obtained by a solar panel is stored in a solar cell (not illustrated), the load can provide the DC bus voltage $v_{DC}$ through the DC terminal DCT of the three-phase inverter 110 to the three-phase inverter 110, so that the three-phase inverter 110 can provide power to the local distribution network from the three-phase power terminal (R, S and T).

In this application, the three-phase inverter 110 can operate in the grid-connection mode when the DC bus voltage $v_{DC}$ rises due to an input solar energy being greater than an energy absorbed by the load, so as to feed in the excessive energy to the local distribution network and regulate a current waveform of the power provided to the local distribution network in order to stabilize the electricity quality of the input current of the local distribution network.

When the three-phase inverter 110 operates in the rectification with power factor correction mode, the driving circuit 120 provides the control signals S1 to S6 based on the switch duty ratios calculated by the controller 130 so that an electrical energy of the three-phase power terminal (R, S and T) is converted in response to the switching of the switch sets M1 to M6 and provided to the DC terminal DCT. In other words, in the rectification with power factor correction mode, the power of the local distribution network may be transmitted through three-phase inverter 110 to the load connected by the DC terminal DCT.

Similarly, in the application of the solar energy power conversion system, the three-phase inverter 110 can operate in the rectification with power factor correction mode when the DC bus voltage $v_{DC}$ drops due to the input solar energy being less than an energy required by the load of the DC terminal DCT, so as to feed in the electricity of the local distribution network to the DC terminal DCT and regulate the current waveform outputted from the local distribution network in order to improve a current harmonic component characteristic thereof.

Figure 2:
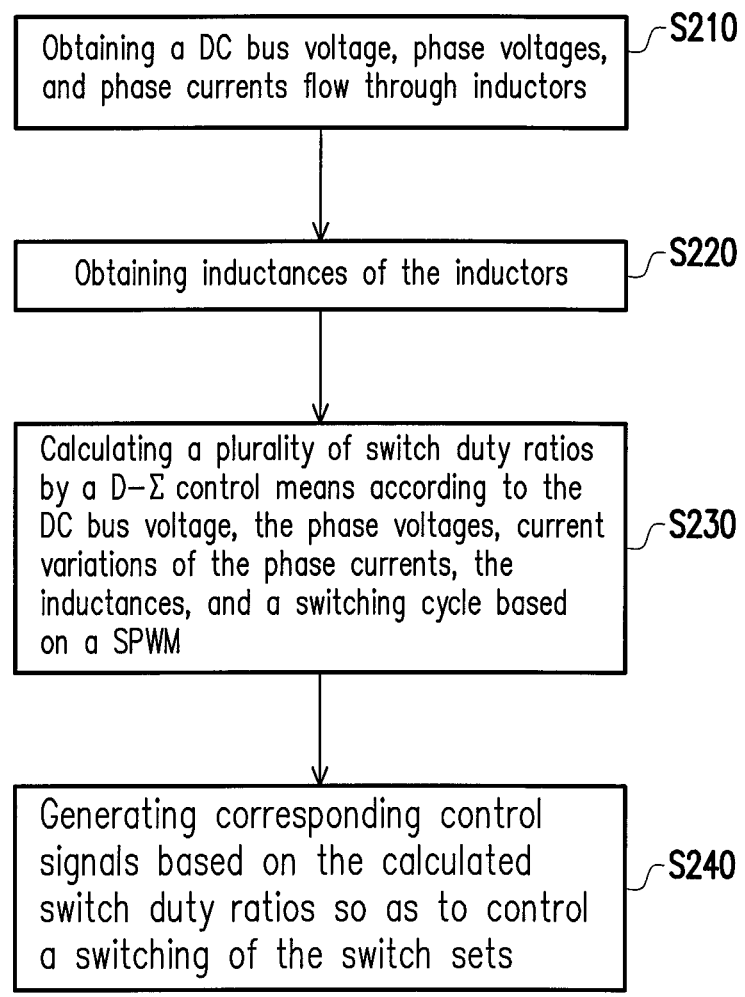
FIG. 2 is a flowchart illustrating steps in a control method of three-phase inverter according to an embodiment of the invention.

Specifically, the driving circuit 120 and the controller 130 of the present application are configured to execute steps and flows of a control method depicted in FIG. 2, so as to generate the corresponding control signals S1 to S6 to control operations of the three-phase inverter 110. FIG. 2 is a flowchart illustrating steps in a control method of three-phase inverter according to an embodiment of the invention.

Referring to FIG. 1 and FIG. 2 together, in the control method of the present application, first of all, the controller 130 obtains voltage and current information, such as the DC bus voltage $v_{DC}$, the phase voltages $v_{RN}$, $v_{SN}$ and $v_{TN}$, and the current variations of the phase currents $i_{LR}$, $i_{LS}$ and $i_{LT}$, from the first feedback circuit 140 and the second feedback circuit 150 (step S210). Next, based on the obtained voltage and current information, the controller 130 further obtains the inductances $L_R$, $L_S$ and $L_T$ respectively varying with the phase currents $i_{LR}$, $i_{LS}$ and $i_{LT}$ (step S220). Thereafter, the controller 130 calculates a plurality of switch duty ratios by a division-summation (D-Σ) control means according to the DC bus voltage $v_{DC}$, the phase voltages $v_{RN}$, $v_{SN}$ and $v_{TN}$, the current variations $\Delta i_{LR}$, $\Delta i_{LS}$ and $\Delta i_{LT}$ of the phase currents, the inductances $L_R$, $L_S$ and $L_T$, and a switching cycle based on the SPWM (step S230). The driving circuit 120 further generates the control signals S1 to S6 based on the switch duty ratios calculated by the controller 130 to control a switching of the switch sets M1 to M6 (step S240).

More specifically, the D-Σ control means is a control law that regards the inductances $L_R$, $L_S$ and $L_T$ as variables while omitting complex calculations of the conventional abc to dq axial transformation but directly defining switch-switching strategies for a demagnetizing direction of the inductances $L_R$, $L_S$ and $L_T$. Therefore, said D-Σ control means can provide characteristics of rapid dynamic response and zero steady-state error. The D-Σ control means based on the SPWM will be further described in the subsequent embodiments.

Based on said D-Σ control means, the inductances $L_R$, $L_S$ and $L_T$ are not constants but regarded as variables that change with the phase currents $i_{LR}$, $i_{LS}$ and $i_{LT}$. In the present embodiment, designers can establish a lookup table LUT based on a correspondence relationship between the inductances of the inductors $L_R$, $L_S$ and $L_T$ and different current levels of the phase currents $i_{LR}$, $i_{LS}$ and $i_{LT}$, and stores the lookup table LUT in a storage unit 132 inside the controller 130. Accordingly, during operations of the three-phase inverter 110, the controller 130 can read the lookup table LUT after receiving the phase currents $i_{LR}$, $i_{LS}$ and $i_{LT}$ from the first feedback circuit 140, and select values matching current magnitudes of the phase currents $i_{LR}$, $i_{LS}$ and $i_{LT}$ from the lookup table LUT to serve as the inductances $L_R$, $L_S$ and $L_T$ according to the phase current information received within each switching cycle.

Incidentally that, the foregoing embodiment of recording the relationship between inductances and the current variations into the lookup table LUT is merely an application for achieving the D-Σ control means of the present application, and the invention is not limited thereto. In other embodiments, the relationship between the inductances of the inductors $L_R$, $L_S$ and $L_T$ and the variations of the phase currents $i_{LR}$, $i_{LS}$ and $i_{LT}$ may also be established by a functionalization such as a optimal linear approximation method.

Figure 3:
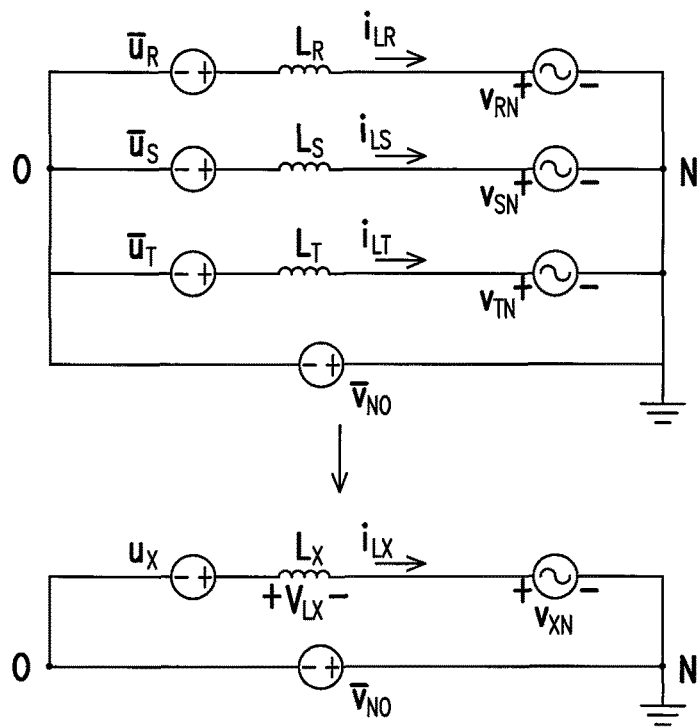
FIG. 3 is an equivalent-circuit diagram illustrating a three-phase inverter according to an embodiment of the invention.
Figure 4:
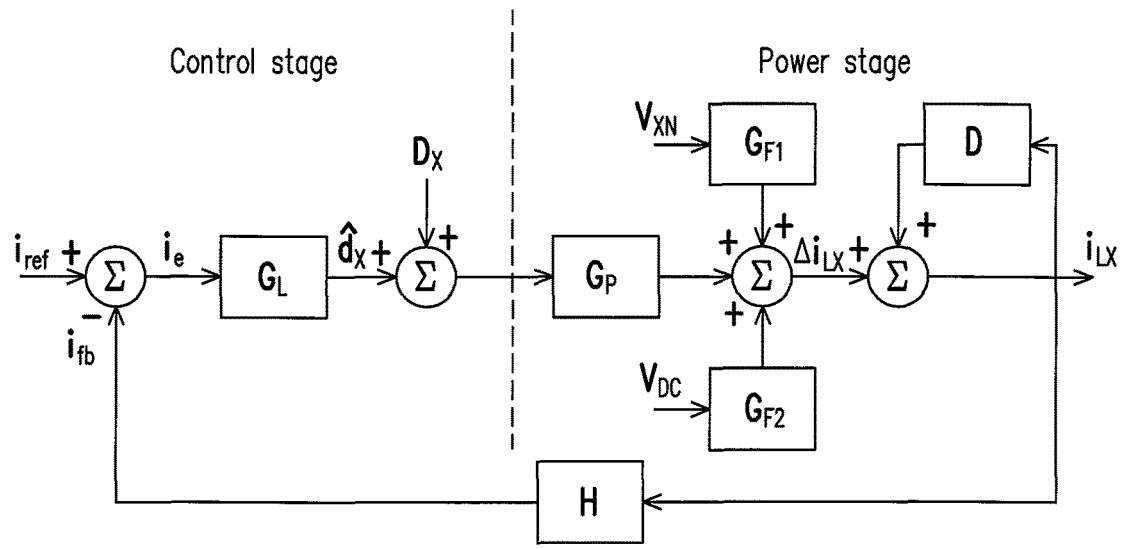
FIG. 4 is a schematic diagram illustrating system control of a three-phase inverting apparatus according to an embodiment of the invention.

In the present embodiment, the D-Σ control means based on the SPWM first regards the three-phase inverter 110 as a target object to be modeled into a current source model for analysis, and then design a gain function of the controller by the D-Σ control means according to the current source model, so as to obtain a control law for outputting the duty ratio of the pulse width modulation. A specific derivation procedure of the D-Σ control means based on the SPWM of the present embodiment is described below in more detail with reference to embodiments of FIG. 3 and FIG. 4. FIG. 3 is an equivalent-circuit diagram illustrating a three-phase inverter according to an embodiment of the invention. FIG. 4 is a schematic diagram illustrating system control of a three-phase inverting apparatus according to an embodiment of the invention.

According to the architecture of the three-phase inverter 110 depicted in FIG. 1, the architecture of the three-phase inverter 110 may be equivalent to an equivalent circuit model as illustrated in the upper portion of FIG. 3. Therein, $\bar{u}_R$, $\bar{u}_S$ and $\bar{u}_T$ are mean state voltages within the switching cycle.

Further, because the bridge arm BA1 and the inductor $L_R$, the bridge arm BA2 and the inductor $L_S$ and the bridge arm BA3 and the inductor $L_T$ may be regarded as three independent circuits, the equivalent circuit in the upper portion of FIG. 3 may further be equivalent to an equivalent circuit in a lower portion of FIG. 3. Based on the Kirchhoff's Law, an equivalent loop equation for the equivalent circuit in the lower portion of FIG. 3 may be established as follows:

$$\bar{u}_X = L_X \frac{di_{LX}}{dt} + v_{XN} + \bar{v}_{NO} \quad (1)$$

In the equation (1), $\bar{u}_X$ is the mean state voltage of the three bridge arms BA1 to BA3; $L_X$ is the inductance; $i_{LX}$ is the phase current; $v_{XN}$ is the phase voltage; and $\overline{v}_{NO}$ is a mean neutral point voltage in which X may be R S or T phases.

On basis of the state-space averaging method, the mean state voltage $\overline{u}_X$ may be expressed as the switch duty ratio multiplied by the DC bus voltage $v_{DC}$. On the other hand, voltage values of the neutral point voltage $v_{NO}$ will change due to different switch states to be $v_{DC}$, $2v_{DC}/3$, $v_{DC}/3$ and 0, respectively. Therefore, after averaging said voltage values within a switching cycle $T_S$, it can be derived that the mean neutral point voltage $\overline{v}_{NO}$ is equal to a coefficient k multiplied by the DC bus voltage $v_{DC}$, where a value of k falls between 0 and 1. Because the control law of the present embodiment is based on the SPWM, the value of k is 0.5 (i.e., in a three-phase four-wire half-bridge inverter architecture, voltages of capacitors in the upper and lower half portions are 0.5 $v_{DC}$). Based on the above, the equation (1) may be further expressed by a state equation in digital form/discrete form as follows:

$$\Delta i_{LX} = \frac{T_S}{L_X}(d_X v_{DC} - v_{XN} - 0.5 v_{DC}) \quad (2)$$

In the equation (2), $$\frac{d i_{LX}}{dt}$$

of the equation (1) is expressed in discrete form, where $T_S$ is the switching cycle; $d_X$ is the switch duty ratio; and $\Delta i_{LX}$ is the current variation of the phase current within one switching cycle $T_S$.

Further, the switch duty ratio $d_X$ may also be expressed as follows:

$$d_X = D_X + \hat{d}_X \quad (3)$$

In the equation (3), $D_X$ is a working point of the switch duty ratio $d_X$, and $\hat{d}_X$ is a small signal variation of the switch duty ratio $d_X$. The working point Dx may be derived from the variation in equation (2) being zero, which is expressed as follows:

$$D_X = 0.5 + \frac{v_{XN}}{v_{DC}} \quad (4)$$

Next, a target object gain and a system feedforward must be found first before the small signal variation $\hat{d}_X$ of the switch duty ratio $d_X$ can be derived. The target object gain defined herein is a ratio of the current variation $\Delta i_{LX}$ to the switch duty ratio $d_X$. The system feedforward defined herein includes a result from a partial differentiation performed on the phase voltage $v_{XN}$ based on the current variation $\Delta i_{LX}$, and a result from the partial differentiation performed on the DC bus voltage $v_{DC}$ based on the current variation $\Delta i_{LX}$. Therein, the target object gain and the system feedforward may be expressed as follows:

$$G_P = -\frac{v_{DC} T_S}{L_X} \quad (5)$$

$$G_{F1} = -\frac{T_S}{L_X} \quad (6)$$

$$G_{F2} = -\frac{k T_S}{L_X} \quad (7)$$

where $G_P$ is the target object gain; $G_{F1}$ is the feedforward associated with the phase voltage $v_X$; and $G_{F2}$ is the feedforward associated with the DC bus voltage $v_{DC}$. Based on the target object gain $G_P$ and the feedforwards $G_{F1}$ and $G_{F2}$, the current source model of the three-phase inverter 110 may be further derived.

Referring to FIG. 4, the current source model of the three-phase inverter 110 is shown by a power stage portion of FIG. 4. After the current source model is derived, the controller 130 may further be designed by using the D-Σ control law. Such control law eliminates influences of system parameters including the switching cycle $T_S$, the inductance $L_X$ and the DC bus voltage $v_{DC}$ to the output current, so that a ratio of the current variation $\Delta i_{LX}$ of the inductor to a feedback current error quantity $i_e$ (i.e., a reference current $I_{ref}$ minus a feedback current $i_{fb}$) is 1 (i.e., unity gain). Physical meaning of the above indicates that the phase current $i_{LX}$ can track a current command of the next switching cycle precisely. Herein, a controller gain is defined as a ratio of the switch duty ratio $d_X$ to the current error quantity $i_e$. In addition, to comply with the spirit of D-Σ control, the controller gain must be the inverse of the target object gain $G_P$. Based on the above, the controller gain may be derived as follows:

$$G_C = \frac{L_X}{T_S v_{DC}} \quad (8)$$

After the controller gain $G_C$ is derived, the overall system control block diagram may be obtained, as shown by a control stage portion of FIG. 4. According to the controller gain $G_C$ derived from FIG. 4 and the equation (8), the small signal variation $\hat{d}_X$ may be expressed as follows:

$$\hat{d}_X = \frac{L_X i_e}{T_S v_{DC}} \quad (9)$$

After the small signal variation $\hat{d}_X$ of the switch duty ratio is derived, together with the previously derived working $D_X$ of the switch duty ratio, the switch duty ratio $d_X$ of the D-Σ control means based on the SPWM may be expressed by an equation as follows:

$$d_X = \frac{L_X i_e}{T_S v_{DC}} + \frac{v_{XN}}{v_{DC}} + \frac{1}{2} \quad (10)$$

Herein, by replacing X of the equation (10) by R, S and T, a plurality of D-Σ control equations based on the SPWM of the switch sets M1 to M6 of the bridge arms BA1 to BA3 can be derived as follows:

$$d_R = \frac{L_R \Delta i_{LR}}{T_S v_{DC}} + \frac{v_{RN}}{v_{DC}} + \frac{1}{2} \quad (11)$$

-continued $$d_S = \frac{L_S \Delta i_{LS}}{T_S v_{DC}} + \frac{v_{SN}}{v_{DC}} + \frac{1}{2} \quad (12)$$

$$d_T = \frac{L_T \Delta i_{LT}}{T_S v_{DC}} + \frac{v_{TN}}{v_{DC}} + \frac{1}{2} \quad (13)$$

The D-Σ control equations (11) to (13) will be built in the controller 130. As such, during operations of the three-phase inverting apparatus 100, according to the sampled current and voltage information and the inductance information obtained from lookup table, the controller 130 can calculate the switch duty ratios $d_R$, $d_S$ and $d_T$ of the bridge arms BA1 to BA3 and send the corresponding command to control the driving circuit 120 so that the driving circuit 120 can generate the corresponding control signals S1 to S6 according to the calculated switch duty ratios $d_R$, $d_S$ and $d_T$ to control the switching of the switch sets M1 to M6.

Herein, it is worth mentioning that, aforementioned derivations are used to express the characteristics of the D-Σ control equations for calculating the switch duty ratios as adopted in the present application, but the control method of the present application is not limited only to be derived from aforesaid methods. In other embodiments, designers can also directly derive the D-Σ control equations shown by the equation (11) to (13) from equation (2). In other words, it falls in the scope of the D-Σ control means of the present application as long as each phase loop of the three-phase inverter 110 is regarded as an independent loop for analysis to establish the equivalent loop equation associated with the mean state voltage of each of the switch sets M1 to M6, the D-Σ control equations based on the SPWM of the switch sets M1 to M6 is obtained according to the equivalent loop equation, and the switch duty ratios of the three-phase inverter 110 are calculated by using the D-Σ control equations. Further, it falls in the scope of the three-phase inverting apparatus 100 of the present application as long as the three-phase inverter 110 is controlled according to the D-Σ control equations to perform the switching the switch sets. The above is what must be explained first.

In comparison with the control of the conventional three-phase inverter, the characteristic of controlling the three-phase inverter 110 by the switch duty ratios calculated according to the D-Σ control equations based on SPWM is that, the process of the abc to dq axial transformation may be omitted so the three-phase inverter 110 is not influenced by limitations from the voltage harmonic distortion and the voltage imbalance of the local distribution network. Further, because the three-phase inverter 110 is built as the current model and a product of the controller gain and the target object gain are designed to be 1, not only can the influences of the physical circuit parameters to the target object be canceled, the wide filter-inductance variation can also be achieved and the current command of the next switching cycle can be tracked precisely by the inductance of the inductor.

Moreover, as compared to the D-Σ control means based on the two phase modulation (TPM) or the space voltage pulse width modulation (SVPWM), the control method of the present application regards each phase loop of the three-phase inverter 110 as the independent loop for analysis, and thus outputs between each phase may be more balance without influencing with each other. Therefore, when the three-phase inverting apparatus 100 of the present application is applied in a power conversion system in which multiple inverters are connected in parallel, the circulating current/zero-sequence current can be suppressed effectively so that the circuit operations may be more stable.

Figure 5:
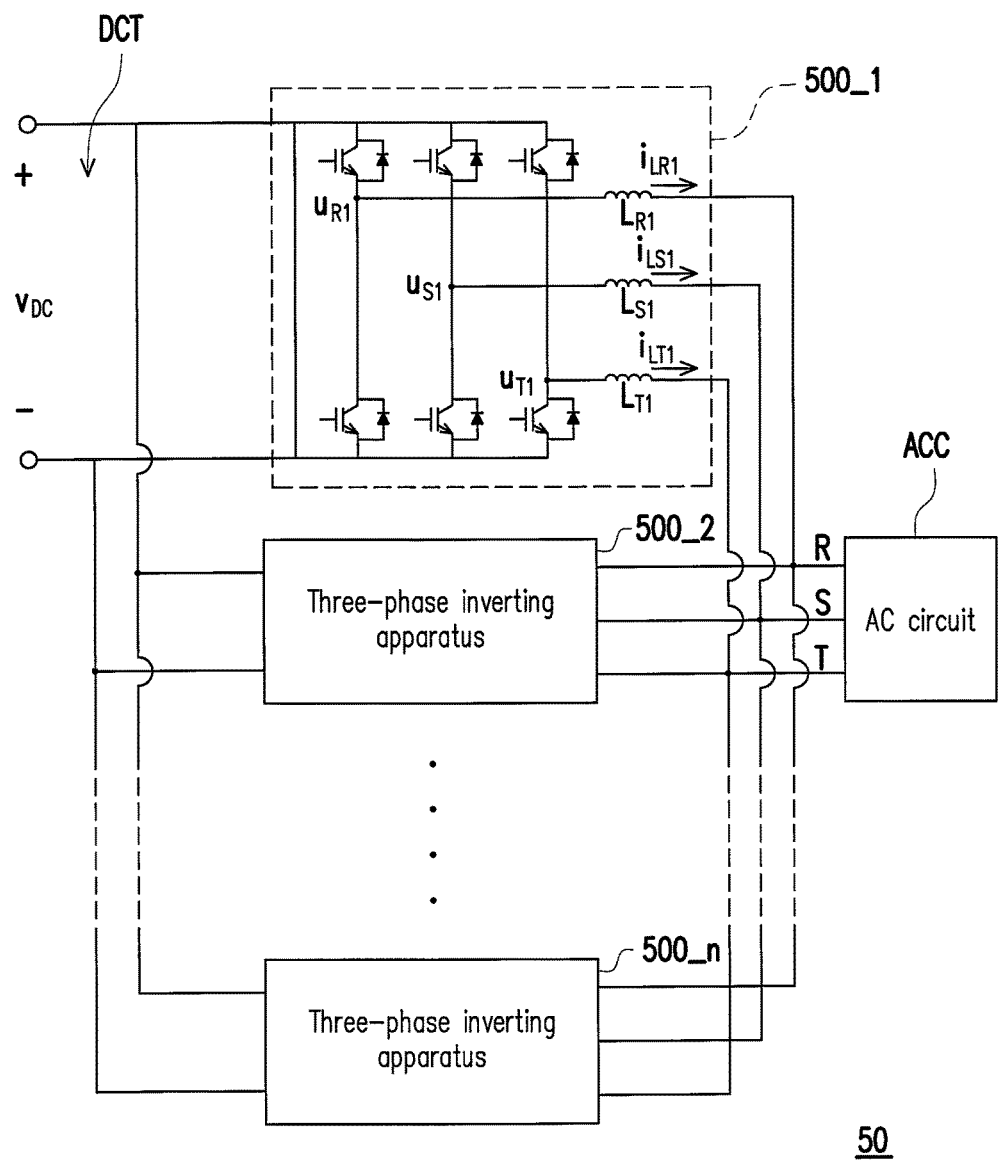
FIG. 5 is a schematic diagram illustrating an architecture of a paralleled power conversion system according to an embodiment of the invention.

Hereinafter, a paralleled power conversion system formed by multiple inverters connected in parallel is described in more detail with reference of the embodiment of FIG. 5. FIG. 5 is a schematic diagram illustrating an architecture of a paralleled power conversion system according to an embodiment of the invention.

Referring to FIG. 5, a paralleled power conversion system 50 includes a N number of three-phase inverting apparatuses 500_1 to 500_n, where n is a positive integer greater than or equal to 2 and definable by system designers. The basic architecture and the control method of each of the three-phase inverting apparatuses 500_1 to 500_n are identical to those described in the foregoing embodiments of FIG. 1 to FIG. 4, which are not repeated hereinafter.

In the present embodiment, the DC terminals DCT of the three-phase inverting apparatuses 500_1 to 500_n are connected to each other in parallel to commonly receive/output the DC bus voltage $v_{DC}$, and the three-phase power terminals (R, S and T) of the three-phase inverting apparatuses 500_1 to 500_n are connected to each other in parallel (i.e., the power terminals R of the three-phase inverting apparatuses 500_1 to 500_n are coupled together; the power terminals S of the three-phase inverting apparatuses 500_1 to 500_n are coupled together; and the power terminals T of the three-phase inverting apparatuses 500_1 to 500_n are coupled together) so as to provide the three-phase power to the AC circuit ACC at back end or receive the three-phase power from the AC circuit ACC in order to perform the power conversion.

Specifically, in an example of the present embodiment, the paralleled power conversion system 50 may be designed as a master-slave control architecture in order to achieve an equal current distribution control. In other words, in the example of the master-salve control architecture, one of the three-phase inverting apparatuses 500_1 to 500_n is defined as a master inverting apparatus, and the rest of the three-phase inverting apparatuses 500_1 to 500_n are defined as slave inverting apparatuses. Hereinafter, the overall system control mechanism is further described based on the assumption that the three-phase inverting apparatus 500_1 is the master inverting apparatus and the three-phase inverting apparatuses 500_2 to 500_n are the slave inverting apparatuses.

In the present embodiment, the master inverting apparatus 500_1 performs a voltage regulation control according to the DC bus voltage $v_{DC}$ on the DC terminal DCT, so as to generate the corresponding control signals to control the three-phase inverter of the master inverting apparatus in order to maintain a voltage level of the DC bus voltage $v_{DC}$. On the other hand, the slave inverting apparatuses 500_2 to 500_n perform an equal current distribution control according to a DC bus current $v_{DC}$ on the DC terminal and an amount of the three-phase inverting apparatuses 500_1 to 500_n within the system so as to calculate a current magnitude to be compensated to each of the slave inverting apparatuses 500_2 to 500_n and thereby generate the corresponding control signals to control each of the three-phase inverters of the slave inverting apparatuses 500_2 to 500_n. In other words, in the master-salve control architecture, the master inverting apparatus is responsible for the output voltage regulation and the slave inverting apparatuses are responsible for tracking the current command sent by the master inverting apparatus in order to achieve the equal current distribution control so that output powers of the three-phase inverting apparatuses 500_1 to 500_*n* can become more equivalent.

In addition, in the conventional power conversion system in which multiple inverters are connected in parallel, because it is difficult to maintain consistency of the output current magnitudes from each of the inverters, an unbalanced current often occurs between the inverters in the system (i.e., the circulating current in system). In the paralleled power conversion system 50 of the present embodiment, since the SPWM modulation is adopted by each of the three-phase inverting apparatuses 500_1 to 500_*n*, each phase loop of the three-phase inverting apparatus is regarded as the independent loop for analysis, and each of the three-phase inverting apparatuses 500_1 to 500_*n* independently tracks a current command of itself. Accordingly, the circulating current between each of the three-phase inverting apparatuses 500_1 to 500_*n* may be effectively suppressed.

In summary, the invention proposes a three-phase inverting apparatus and a control method and a paralleled power conversion system thereof. Said control method adopts the D-Σ control means based on the SPWM to calculate the switch duty ratio of each of the switch sets in the three-phase inverter according to operation information of the three-phase inverter. Accordingly, the three-phase inverter applying the control method of the present application can conduct the corresponding control adjustment in response to the inductance variations, so as to avoid the distortion caused by the output harmonic of the local distribution network. Further, because the control method of the present application does not requires complex calculation of the abc to dq axial transformation as used in the conventional control means, the conversion procedure may be simplified. Furthermore, because the present application regards each phase loop as the independent loop for analysis based on the SPWM modulation to thereby derive the D-Σ control law, when the paralleled power conversion system is constituted by applying the three-phase inverting apparatuses of the present application, each of the three-phase inverting apparatuses can tracks the current command of itself so that the issue of circulating current may be effectively suppressed for the paralleled power conversion system.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

What is claimed is:

1. A control method of three-phase inverter, configured for controlling a three-phase inverter having switch sets, a first inductor, a second inductor and a third inductor, wherein the control method comprises:
    obtaining a DC bus voltage, a first phase voltage, a second phase voltage and a third phase voltage, and a first phase current, a second phase current and a third phase current respectively flowing through the first inductor, the second inductor and the third inductor;
    obtaining inductances of the first inductor, the second inductor and the third inductor, wherein the inductances respectively vary with the first phase current, the second phase current and the third phase current;
    calculating switch duty ratios by a division-summation control means according to the DC bus voltage, the phase voltages, current variations of the phase currents, the inductances, and a switching cycle based on a sinusoidal pulse width modulation; and
    generating corresponding control signals based on the switch duty ratios so as to control a switching of the switch sets,
    wherein the step of obtaining the inductances of the first inductor, the second inductor, and the third inductor comprises:
        reading a lookup table indicating a correspondence relationship between different current levels and the inductances; and
        selecting values matching the first phase current, the second phase current and the third phase current from the lookup table to serve as the inductances of the first inductor, the second inductor and the third inductor.

2. The control method of three-phase inverter of claim 1, wherein the step of calculating the switch duty ratios by the division-summation control means comprises:
    establishing an equivalent loop equation associated with a mean state voltage of each of the switch sets;
    obtaining a plurality of division-summation control equations based on the sinusoidal pulse width modulation of the switch sets according to the equivalent loop equation; and
    respectively substituting the DC bus voltage, the phase voltages, the current variations and the switching cycle in the division-summation control equations so as to calculate the switch duty ratios.

3. The control method of three-phase inverter of claim 2, wherein the equivalent loop equation is expressed by:

$$\bar{u}_X = L_X \frac{di_{LX}}{dt} + v_{XN} + \bar{v}_{NO}$$

wherein $\bar{u}_X$ being the mean state voltage, $L_X$ being the inductance of each of the inductors, $i_{LX}$ being each of the phase currents, $v_{XN}$ being each of the phase voltages, and $\bar{v}_{NO}$ being a neutral point voltage.

4. The control method of three-phase inverter of claim 1, wherein the three-phase inverter has a DC terminal and a three-phase power terminal, and the control method further comprises:
    when the three-phase inverter operates in a first operation mode, providing the control signals based on the calculated switch duty ratios so that an electrical energy of the DC terminal is converted in response to the switching of the switch sets and provided to the three-phase power terminal; and
    when the three-phase inverter operates in a second operation mode, providing the control signals based on the calculated switch duty ratios so that an electrical energy of the three-phase power terminal is converted in response to the switching of the switch sets and provided to the DC terminal.

5. A three-phase inverting apparatus, comprising:
    a three-phase inverter having switch sets, a first inductor, a second inductor and a third inductor, wherein a first phase current, a second phase current and a third phase current respectively flow through the first inductor, the second inductor and the third inductor;
    a driving circuit, coupled to the three-phase inverter and providing a plurality of control signals to control the three-phase inverter; and a controller, coupled to the driving circuit to control operations of the driving circuit, wherein the controller obtains a DC bus voltage, a first phase voltage, a second phase voltage and a third phase voltage, the first phase current, the second phase current and the third phase current, and inductances of the first inductor, the second inductor and the third inductor, and then calculates switch duty ratios by a division-summation control means according to the DC bus voltage, the phase voltages, current variations of the phase currents, the inductances, and a switching cycle based on a sinusoidal pulse width modulation, wherein the controller controls the driving circuit based on the switch duty ratios to generate the corresponding control signals so as to control a switching of the switch sets, wherein the inductances respectively vary with the first phase current, the second phase current and the third phase current, wherein the controller establishes a plurality of division-summation control equations based on the sinusoidal pulse width modulation, and respectively inputs the DC bus voltage, the phase voltages, the current variations and the switching cycle to the division-summation control equations so as to calculate the switch duty ratios, wherein the division-summation control equations are expressed by:

$$d_R = \frac{L_R \Delta i_{LR}}{T_S v_{DC}} + \frac{v_{RN}}{v_{DC}} + \frac{1}{2};$$

$$d_S = \frac{L_S \Delta i_{LS}}{T_S v_{DC}} + \frac{v_{SN}}{v_{DC}} + \frac{1}{2}; \text{ and}$$

$$d_T = \frac{L_T \Delta i_{LT}}{T_S v_{DC}} + \frac{v_{TN}}{v_{DC}} + \frac{1}{2},$$

wherein $d_R$, $d_S$ and $d_T$ respectively being a first switch duty ratio, a second switch duty ratio and a third switch duty ratio, $L_R$, $L_S$ and $L_T$ respectively being the first inductor, the second inductor and the third inductor, $\Delta i_{LR}$, $\Delta i_{LS}$ and $\Delta i_{LT}$ respectively being the current variations of the first phase current, the second phase current and third phase current within the switching cycle, $T_S$ being the switching cycle, $v_{DC}$ being the DC voltage, and $v_{RN}$, $v_{SN}$ and $v_{TN}$ respectively being the first phase voltage, the second phase voltage and the third phase voltage.

6. A control method of three-phase inverter, configured for controlling a three-phase inverter having switch sets, a first inductor, a second inductor and a third inductor, wherein the control method comprises:

obtaining a DC bus voltage, a first phase voltage, a second phase voltage and a third phase voltage, and a first phase current, a second phase current and a third phase current respectively flowing through the first inductor, the second inductor and the third inductor;

obtaining inductances of the first inductor, the second inductor and the third inductor, wherein the inductances respectively vary with the first phase current, the second phase current and the third phase current;

calculating switch duty ratios by a division-summation control means according to the DC bus voltage, the phase voltages, current variations of the phase currents, the inductances, and a switching cycle based on a sinusoidal pulse width modulation; and generating corresponding control signals based on the switch duty ratios so as to control a switching of the switch sets, wherein the step of calculating the switch duty ratios by the division-summation control means comprises:

establishing an equivalent loop equation associated with a mean state voltage of each of the switch sets;

obtaining a plurality of division-summation control equations based on the sinusoidal pulse width modulation of the switch sets according to the equivalent loop equation; and respectively substituting the DC bus voltage, the phase voltages, the current variations and the switching cycle in the division-summation control equations so as to calculate the switch duty ratios, wherein the division-summation control equations are expressed by:

$$d_R = \frac{L_R \Delta i_{LR}}{T_S v_{DC}} + \frac{v_{RN}}{v_{DC}} + \frac{1}{2};$$

$$d_S = \frac{L_S \Delta i_{LS}}{T_S v_{DC}} + \frac{v_{SN}}{v_{DC}} + \frac{1}{2}; \text{ and}$$

$$d_T = \frac{L_T \Delta i_{LT}}{T_S v_{DC}} + \frac{v_{TN}}{v_{DC}} + \frac{1}{2},$$

wherein $d_R$, $d_S$ and $d_T$ respectively being a first switch duty ratio, a second switch duty ratio and a third switch duty ratio, $L_R$, $L_S$ and $L_T$ respectively being the first inductor, the second inductor and the third inductor, $\Delta i_{LR}$, $\Delta i_{LS}$ and $\Delta i_{LT}$ respectively being the current variations of the first phase current, the second phase current and third phase current within the switching cycle, $T_S$ being the switching cycle, $v_{DC}$ being the DC voltage, and $v_{RN}$, $v_{SN}$ and $v_{TN}$ respectively being the first phase voltage, the second phase voltage and the third phase voltage.

7. A control method of three-phase inverter, configured for controlling a three-phase inverter having switch sets, a first inductor, a second inductor and a third inductor, wherein the control method comprises:

obtaining a DC bus voltage, a first phase voltage, a second phase voltage and a third phase voltage, and a first phase current, a second phase current and a third phase current respectively flowing through the first inductor, the second inductor and the third inductor;

obtaining inductances of the first inductor, the second inductor and the third inductor, wherein the inductances respectively vary with the first phase current, the second phase current and the third phase current;

calculating switch duty ratios by a division-summation control means according to the DC bus voltage, the phase voltages, current variations of the phase currents, the inductances, and a switching cycle based on a sinusoidal pulse width modulation; and generating corresponding control signals based on the switch duty ratios so as to control a switching of the switch sets, wherein the step of calculating the switch duty ratios by the division-summation control means comprises:

establishing an equivalent loop equation associated with a mean state voltage of each of the switch sets;

obtaining a plurality of division-summation control equations based on the sinusoidal pulse width modulation of the switch sets according to the equivalent loop equation; and respectively substituting the DC bus voltage, the phase voltages, the current variations and the switching cycle in the division-summation control equations so as to calculate the switch duty ratios, wherein the step of obtaining the division-summation control equations based on the sinusoidal pulse width modulation of the switch sets according to the equivalent loop equation comprises:

establishing a current source model of the three-phase inverter according to the equivalent loop equation and calculating a working point of each of the switch sets;

calculating a controller gain according to the current source model; and establishing the division-summation control equations based on the controller gain and the working point of each of the switch sets.

8. A three-phase inverting apparatus, comprising:

a three-phase inverter having switch sets, a first inductor, a second inductor and a third inductor, wherein a first phase current, a second phase current and a third phase current respectively flow through the first inductor, the second inductor and the third inductor;

a driving circuit, coupled to the three-phase inverter and providing a plurality of control signals to control the three-phase inverter; and a controller, coupled to the driving circuit to control operations of the driving circuit, wherein the controller obtains a DC bus voltage, a first phase voltage, a second phase voltage and a third phase voltage, the first phase current, the second phase current and the third phase current, and inductances of the first inductor, the second inductor and the third inductor, and then calculates switch duty ratios by a division-summation control means according to the DC bus voltage, the phase voltages, current variations of the phase currents, the inductances, and a switching cycle based on a sinusoidal pulse width modulation, wherein the controller controls the driving circuit based on the switch duty ratios to generate the corresponding control signals so as to control a switching of the switch sets, wherein the inductances respectively vary with the first phase current, the second phase current and the third phase current, wherein the controller comprises:

a storage unit, storing a lookup table indicating a correspondence relationship between different current levels and the inductances, wherein the controller reads the lookup table of the storage unit when the controller calculates the switch duty ratios by the division-summation control means, so as to select values matching the first phase current, the second phase current and the third phase current from the lookup table to serve as the inductances of the first inductor, the second inductor and the third inductor.

9. The three-phase inverting apparatus of claim 8, wherein the controller establishes a plurality of division-summation control equations based on the sinusoidal pulse width modulation, and respectively inputs the DC bus voltage, the phase voltages, the current variations and the switching cycle to the division-summation control equations so as to calculate the switch duty ratios.

10. The three-phase inverting apparatus of claim 8, further comprising:

a first feedback circuit, coupled to the controller and a three-phase power terminal of the three-phase inverter, and configured to sample the phase voltages and the current variations of the phase currents from the three-phase power terminal and provide the sampled phase voltages and the sampled current variations to the controller; and a second feedback circuit, coupled to the controller and a DC terminal of the three-phase inverter, and configured to sample the DC bus voltage from the DC terminal and provide the sampled DC bus voltage to the controller.

11. A paralleled power conversion system, comprising:

a plurality of the three-phase inverting apparatuses of claim 8, wherein the DC terminals of the three-phase inverters are to each other in parallel, and the three-phase power terminals of the three-phase inverters are connected to each other in parallel.

12. The paralleled power conversion system of claim 11, wherein one of the three-phase inverting apparatuses is a master inverting apparatus, and the rest of three-phase inverting apparatuses are slave inverting apparatuses, wherein the master inverting apparatus performs a voltage regulation control so as to generate the corresponding control signal to control the three-phase inverter of the master inverting apparatus in order to maintain a voltage level of the DC bus voltage, and the slave inverting apparatuses perform an equal current distribution control according to a DC bus current on the DC terminal and an amount of the three-phase inverting apparatuses so as to calculate a current magnitude to be compensated to each of the slave inverting apparatuses and thereby generate the corresponding control signals for controlling each of the three-phase inverters of the slave inverting apparatuses.

13. The paralleled power conversion system of claim 12, wherein each of the three-phase inverting apparatuses independently tracks a current command of itself so as to compress a circulating current between each of the three-phase inverting apparatuses.

* * * * *